May 16, 1950        W. BACHELDOR        2,507,749
VIBRATING DEVICE FOR DUMPING LOADED VEHICLES
Filed Jan. 10, 1947        3 Sheets-Sheet 1
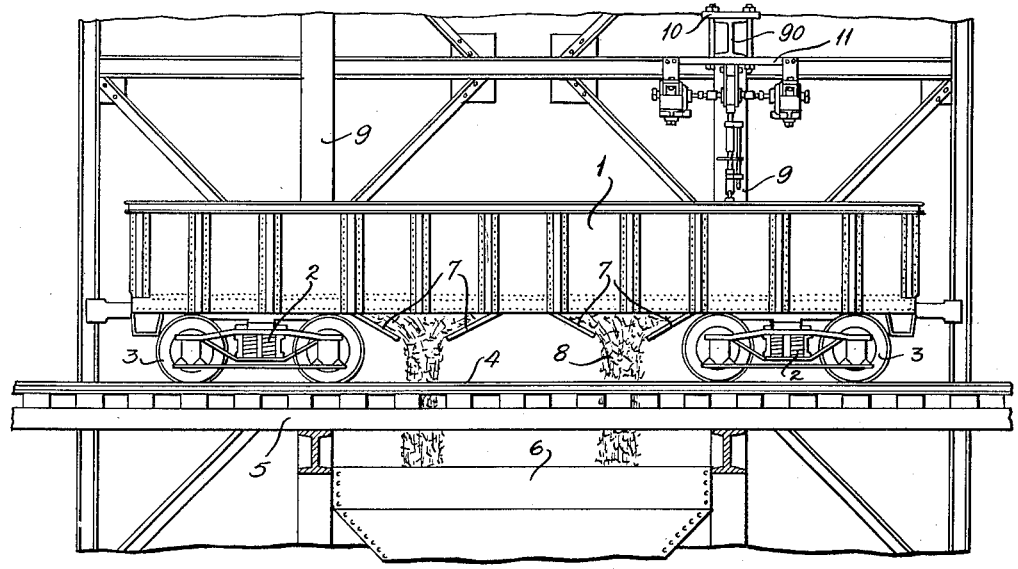
FIG. 1.
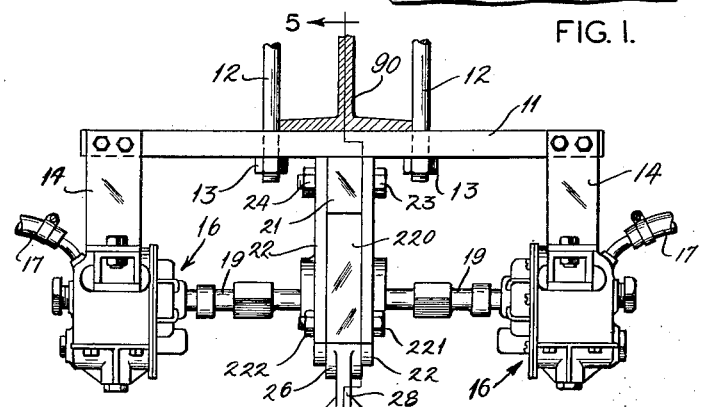
FIG. 2.
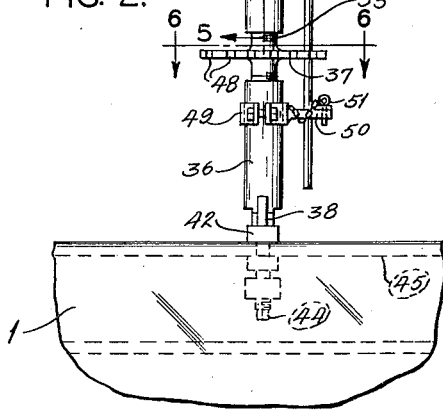
INVENTOR:
WILLIAM BACHELDOR
BY Bruninga and Sutherland
ATTORNEYS.

May 16, 1950            W. BACHELDOR            2,507,749
VIBRATING DEVICE FOR DUMPING LOADED VEHICLES
Filed Jan. 10, 1947            3 Sheets-Sheet 2
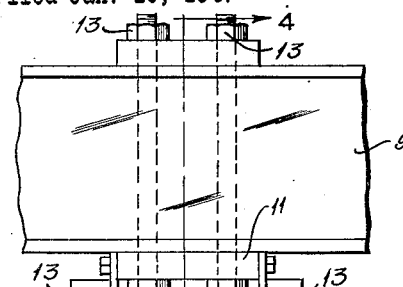
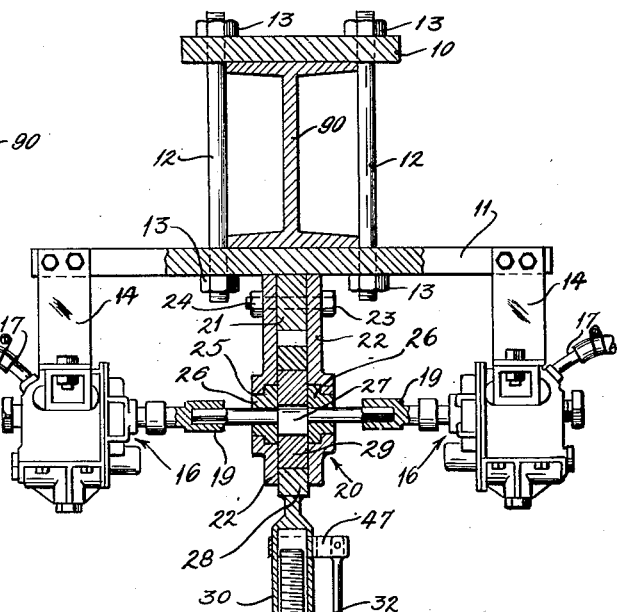
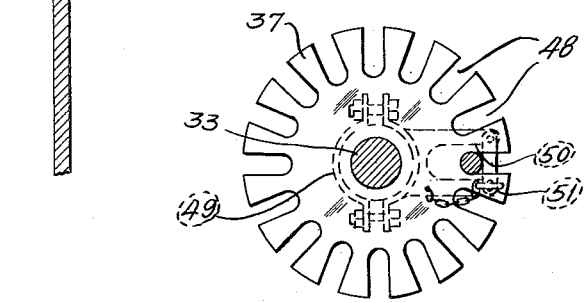
FIG. 3.
FIG. 4.
FIG. 6.
INVENTOR:
WILLIAM BACHELDOR
BY Bruninga and Sutherland
ATTORNEYS May 16, 1950     W. BACHELDOR     2,507,749
VIBRATING DEVICE FOR DUMPING LOADED VEHICLES
Filed Jan. 10, 1947     3 Sheets-Sheet 3

INVENTOR:
WILLIAM BACHELDOR

BY Bruninga and Sutherland
ATTORNEYS.

Patented May 16, 1950

2,507,749

UNITED STATES PATENT OFFICE 2,507,749

VIBRATING DEVICE FOR DUMPING LOADED VEHICLES

William Bacheldor, Wood River, Ill., assignor, by mesne assignments, to Illinois Stoker Company, Alton, Ill., a corporation of Illinois Application January 10, 1947, Serial No. 721,369

3 Claims. (Cl. 214—44)

This invention relates to a mechanism for expediting the unloading of materials from large, spring-supported vehicles and more specifically to the removal of materials from railway hopper or gondola cars normally discharging the load through openings in or near the bottom of the vehicle body and under the force of gravity.

Hitherto numerous devices have been used to break loose or shake out the load from railroad cars and other vehicles when the materials therein contained (due to compaction in transit or an inherent quality of cohesion of the particles) frictionally resist free gravitational flow through the hopper or dumping orifice. Limitations of such devices have been their size, the requirement of a precise positioning of the car to be unloaded, both with respect to the shaking device and to the materials receiver, and lack of proper adjustment in the direction of the force applied to the car being dumped, so as to efficiently overcome the resistance of the contained material to gravitational flow.

An object of this invention is to provide a shaking device for loaded vehicles which is relatively light and easy of adjustment to the vehicle framework at a variety of points, but which is sufficiently strong and rugged to vibrate the entire vehicle framework and the contained load.

Another object is to provide a vehicle shaker which will act in conjunction with the vehicle's springs to develop an extremely rapid, yet nonetheless smooth oscillation and one which will obviate damaging jolting and jarring of the vehicle and the shaking device.

A third object is to provide a shaker which can be readily adjusted to different types of loaded vehicles to provide a maximum shaking efficiency in dislodging the contained materials.

Other objects will appear from the detail description of the invention given in conjunction with the accompanying drawings of which:

Figure 1 is a diagrammatic side view of an embodiment of this invention attached to the top of a side of a railroad car positioned on a dumping platform;

Figure 2 is a detail side view of the vibrating device of Figure 1;

Figure 3 is a view taken at right angles to that of Figure 2;

Figure 4 is a detail view in partial section of the device taken along line 4—4 of Figure 3;

Figure 6 is an enlarged detail view of the adjusting mechanism taken along line 6—6 of Figure 2;

Figure 7:
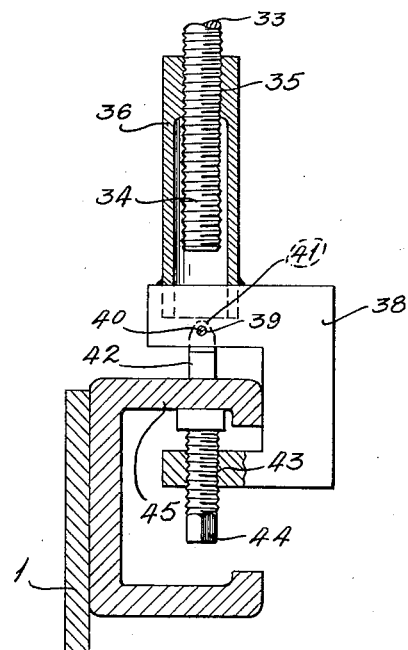
Figure 7 is an enlarged view in partial section of the clamp shown in Figure 3.

Generally speaking, and in accordance with this invention, a spring-supported vehicle having dumping apertures in its bottom is positioned over or adjacent to a materials receiver. In close proximity to the materials receiver and the vehicle is a rigid support for a vibrating machine. This support may, however, extend along the longitudinal axis of the vehicle at the point of unloading and need not be above the vehicle's framework, but may be at any elevation, provided that the structure does not interfere with the positioning of the vehicle over the materials receiver, nor extend into the path of the normal gravitational flow of the materials from the vehicle. It must be so constructed, however, that a vibrating machine, when positioned thereon, will be in approximate plumb with a side or a partition of the vehicle framework.

A suitable vibrating device or machine may consist of a rotatable fluid or electric motor driving a shaft with mechanism for converting the rotary motion of the shaft into reciprocatory motion and transmitting the latter to the spring supported vehicle body. Preferably the direction of the reciprocatory motion is substantially vertical, so that vibration occurs in the general direction of the action of the vehicle's springs.

After attaching the vibrating apparatus to the vehicle body, the dumping apertures of the vehicle being open, the motor is started and a rapid reciprocation and oscillation of the vehicle body and its contents is set up. Since the reciprocating motion set up is substantially upward and downward, the springs of the vehicle are exercised. Upon one stroke of the thrust arm they tend to resist or cushion that stroke, while on the counter-stroke the springs aid in the completion of the cycle set up. At the start of the unloading operation reciprocations are in a substantially vertical orbit, the transverse movement to the springs in the cycle being small. This is due to the fact that the load is evenly distributed upon the springs on both sides of the vehicle. As the vehicle empties itself, however, the vibrating device is acting directly counter to the springs supporting the side to which it is attached, whereas the springs on the opposite side are being continually relieved of compression. This progressively translates the reciprocation of the vehicle body from the substantially vertical plane at the start into both a vertical and a transverse oscillation. The result of this is that throughout the entire dumping operation the usual jolting and jarring, both of the vehicle and of the vibrating mechanism, is relieved. Further, the maximum shearing force of the compacted materials is developed at the start of the operation when it is needed, and thereafter falls off at the end of the operation when such great shear is no longer necessary.

Referring to the drawings which illustrate a specific embodiment of the invention, 1 designates a conventional, hopper-bottomed railroad car with springs 2 and wheels 3, positioned upon tracks 4 over a dumping platform 5 and a materials receiver 6. Hopper doors 7 open to drop contained materials 8 into hopper 6 under the force of gravity. Vertical supports 9 sustain I-beam 90 which extends transverse to the longitudinal axis of the car 1.

Any suitable means is provided for suspending the vibrating mechanism to be described from I-beam 90 and is illustrated in the drawings to consist of two plates 10 and 11 slidably secured to I-beam 90 by through bolts 12 and nuts 13. From each end of lower plate 11 depend bracket straps 14 which support upon each side a pair of air motors 16 and hose connections 17. Powered shaft 19 is rotatably mounted between the motors 16 and extends through an eccentric housing generally designated 20, and which is shown to consist of beam 21 welded to the underside of support plate 11, side plates 22 secured to beam 21 by through bolts 23 and nuts 24 and front and rear plates 220 bolted to plates 22 by bolts 221 and nuts 222. Both depending plates 22 have bearing bosses which are drilled at 25 to receive both shaft 19 and the bearing collars 26.

Figure 5:
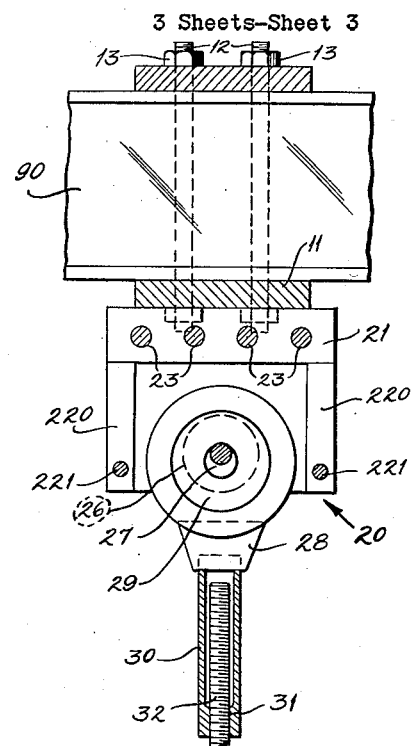
Figure 5 is an enlarged section of the device taken along line 5—5 of Figure 2.

Centrally located between bearing collars 26 and eccentrically fixed to powered shaft 19 is eccentric 27, Figures 4 and 5. A metal collar 28, bored to fit eccentric 27 and bearing 29, depends from shaker bearing 27 within the housing 20 and is made integral with a pipe 30. It will be readily apparent that when powered shaft 19 is rotated the eccentric 27 will cause the pipe 30 to reciprocate longitudinally.

As a means of transferring this longitudinal reciprocation from eccentric 27 through collar 28 and pipe 30, pipe 30 is threaded at 31, Figures 4, 5 and 7, with left hand threads to receive the left hand thread 32 of a thrust rod 33. In similar manner, rod 33 is threaded at its opposite end 34, but in a counter-direction, so as to screw into the right hand threads 35 of a pipe 36. Centrally disposed upon and fixed to rod 33 is a star wheel 37 by means of which rod 33 can be twisted so as to screw into the sections of pipe 30 and 36.

A metal clamp 38 is welded or otherwise fixedly secured to pipe 36 and is bored at 39 to receive rivet 40 which passes through straps 41 from which depends an adjusting block 42. Adjusting block 42 is capable of a limited rotation around the rivet 40, within the open jaw of clamp 38 and adapts itself to small angles in the edge or sides of the vehicle to which the clamp attaches. Clamp 38 is also bored at 43, the hole being threaded to receive threaded adjusting stud 44. Clamp 38, as shown in Figures 2, 3 and 7, securely grips edge 45 of car 1 between adjusting block 42 and stud 44.

It will be readily apparent that the overall length of the coupling members from eccentric shaft 19 to clamp 38 can be adjusted to present clamp 38 to the edge or side of varying types and sizes of vehicles by merely turning star wheel 37, Figures 2, 3 and 4, to shorten or lengthen the engagement of threaded rod 33 in the pipe lengths 30 and 36.

To prevent rod 33 from twisting under vibration after the initial adjustment of the coupling assembly to a vehicle has been made, a lock rod 46 hinged to a collar 47 around pipe 30 is provided. After star wheel 37 has been turned to the desired adjustment, lock rod 46 is inserted in a slot 48 in wheel 37 and the free end is then secured to pipe 36 in any suitable manner, as by collar 49, the jaw 50 and the pin 51 in Figure 3.

In operation, the vibrating mechanism described is positioned either directly over car edge 45 or at any desirable angle thereto, the angle being limited only by the length to which thrust bar 33 can be extended between the threaded pipes 30 and 36. Clamp 38 is adjusted to the edge of the car. Threaded rod 33 is locked in position against vibration with rod 46 and motor 16 is turned on. The resultant thrust transmitted downwardly as eccentric 27 revolves around the drive shaft 19, compresses and releases springs 2, and a violent vibration of the load results. It has been found that vibrations delivered to the load at the rate of 200 to 250 per minute give excellent results and that this force fully and effectively can shake out the materials through the hoppers of the usual railroad carrier in a time dependent solely upon the ability of the materials receiver to carry the load away.

The device is safe, efficient and particularly adapted to dislodging highly compacted materials with a high angle of repose, such as coal screenings.

If desired, the support girder 90 may extend longitudinally of the car instead of transversely, as shown.

Figure 8:
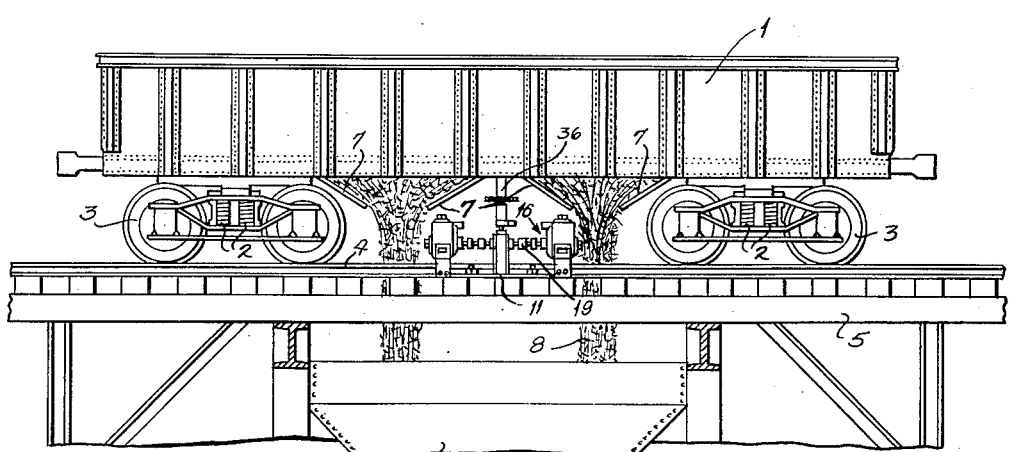
Figure 8 is a view of a modification in the attachment of the vibrating device of Figure 1 to a loaded wheeled vehicle.

A distinct advantage of the vibrating device obtains when it is desired to unload a bottom dumping car which is not positioned over a regular dumping platform. All that is required to vibrate the load is to affix the vibrating assembly to the track 4, Figure 8, support plates 10 and 11, in this instance, grip the track and the clamp 38 fastens to a structural member in the lower edge of the car. Although the vibrating force is directed upwardly, in this instance, this attachment of the device is nonetheless effective and utilitarian. In either of the adjustments hereinbefore described the vibratory action makes full use of the cushioning springs to prevent jolting and jarring of the vehicle unloaded and of the vibrating mechanism itself.

It will be understood that the invention is not limited to the particular modifications described, but is to include all adaptations compatible with the specification and within the scope of the appended claims.

Having thus described the invention, what is claimed and desired to be secured by Letters Patent is:

1. A reciprocating mechanism for dumping a loaded spring-supported vehicle having dumping openings in its bottom, comprising, a rigid support adjacent to such vehicle, means for reciprocating said vehicle secured to said support at one end so as to be in substantial vertical alignment with a side of said vehicle's body and connected to said side at the other end, said connection between said reciprocating means and said side including an extensible thrust arm terminating in a clamp for gripping said side, and locking means for preventing extension of said thrust arm after adjustment and during reciprocation, said reciprocating action being in a plane more parallel than transverse to said side when shaking out the load.

2. The combination with a fixed support adjacent which a spring mounted railway vehicle having dump openings in its bottom may be spotted to discharge bulk loads, of an apparatus mounted on said support for shaking the vehicle on its own springs comprising, a thrust arm releasably engageable with a side wall of the vehicle body, and power means for reciprocating said thrust arm in substantial vertical alignment with said side wall.

3. The combination with a fixed support adjacent which a spring mounted railway vehicle having dump openings in its bottom may be spotted to discharge bulk loads, of an apparatus mounted on said support for shaking the vehicle on its own springs, comprising a powered shaft, an eccentric upon said shaft, an extensible thrust arm attached to said eccentric so as to translate rotation of said eccentric into reciprocating movement perpendicular to the axis of rotation of said shaft, said arm consisting of a plurality of screw-threaded sections relatively adjustable to vary the length of said arm, a latch extending across the junction between said sections for locking said sections against relative movement of their screw-threads, and means for connecting said arm to a spring-supported portion of said vehicle.

WILLIAM BACHELDOR.

REFERENCES CITED

The following references are of record in the file of this patent:

UNITED STATES PATENTS

| Number | Name | Date |
|---|---|---|
| 790,015 | Walsh | May 16, 1905 |
| 833,761 | Stevens | Oct. 23, 1906 |
| 1,212,252 | Pellegrino | Jan. 16, 1917 |
| 1,511,279 | Jackson | Oct. 14, 1924 |
| 1,593,303 | Hill | July 20, 1926 |
| 1,997,379 | Finney | Apr. 9, 1935 |
| 2,054,253 | Horsch | Sept. 15, 1936 |
| 2,060,130 | Scott | Nov. 10, 1936 |
| 2,108,416 | Smith et al. | Feb. 15, 1938 |
| 2,185,850 | Jackson | Jan. 2, 1940 |
| 2,215,201 | Vogel-Jorgensen | Sept. 17, 1940 |
| 2,353,492 | O'Connor | July 11, 1944 |

FOREIGN PATENTS

| Number | Country | Date |
|---|---|---|
| 677,509 | Germany | June 27, 1939 |